UNITED STATES PATENT OFFICE.

HEINRICH THRON, OF FRANKFORT-ON-THE-MAIN, GERMANY, ASSIGNOR TO THE FIRM OF VEREINIGTE CHININFABRIKEN ZIMMER & CO. G. M. B. H., OF FRANKFORT-ON-THE-MAIN, GERMANY.

MANUFACTURE OF HYDROQUININ.

1,038,027.   Specification of Letters Patent.   Patented Sept. 10, 1912.

No Drawing.   Application filed March 7, 1912.   Serial No. 682,276.

*To all whom it may concern:*

Be it known that I, HEINRICH THRON, a subject of the German Emperor, and resident of Frankfort-on-the-Main, Germany, have invented certain new and useful Improvements in the Manufacture of Hydroquinin, of which the following is a specification.

The specification of the U. S. Patent No. 989664 describes the conversion of the cinchona alkaloids into the corresponding hydrocinchona alkaloids by the aid of colloidal solutions of metals of the platinum group. I have, on further developing the process, found that the metals of the platinum group can themselves be used for the said purpose, these being preferably employed in the finely divided state known as "blacks", or the said metals may be deposited on inert bodies.

The following are examples of how this invention may be performed, but it is not restricted to these precise examples. The parts are by weight.

Example I: To a solution of 125 parts of quinin sulfate in 700 parts of water and 20 parts of sulfuric acid ½ a part of palladium black is added, and the mixture is shaken with hydrogen (which is under low pressure) until a sample of such mixture so treated is found to be stable toward potassium permanganate. Then the palladium powder is filtered off and the mass neutralized, under heat, with soda lye. Hydroquinin sulfate at once crystallizes in the form of fine needles.

Example II: To a solution of 125 parts of quinin sulfate in 700 parts of water and 20 parts of sulfuric acid 25 parts of a 2 per cent. solution of palladious chlorid are added, and the mixture is shaken with hydrogen (whereby the palladious chlorid or a part thereof is converted into finely divided metallic palladium) until a sample of the mixture so treated is found to be stable toward potassium permanganate. After allowing the liquor to stand for several days, it is poured off to separate it from the palladium powder which has deposited at the bottom of the vessel. The liquor is neutralized under heat with soda lye. The hydroquinin sulfate crystallizes in fine needles. The deposit is again mixed with fresh quinin sulfate solution and by shaking this with hydrogen, further quantities of quinin are converted into hydroquinin.

Example III: To 20 parts of barium sulfate precipitated under heat, and suspended in 400 parts of water, a solution of 1 part of palladious chlorid in 50 parts of water, and afterward 1 part of formaldehyde, are added, and the mixture is rendered slightly alkaline by soda lye and heated for a few minutes to boiling point. When the supernatant liquor is perfectly clear and colorless, it is filtered off and the gray deposit, which consists of barium sulfate coated with finely divided palladium, is washed several times with hot water. This deposit is added to a solution of 250 parts of quinin sulfate in 1400 parts of water and 40 parts of sulfuric acid, and the mixture is shaken with hydrogen, under a pressure of about 4 meters of water, until a sample of the liquid is found to be stable toward potassium permanganate. Then the liquid is filtered off from the precipitate, and the filtrate is neutralized, under heat, by soda lye. The hydroquinin sulfate crystallizes at once in the form of colorless needles. The barium sulfate which is filtered off, and which is coated with palladium, can, without any further treatment, be used for the reduction of further quantities of quinin.

I claim:

1. The manufacture of hydro-cinchona-alkaloids by treating a cinchona alkaloid with hydrogen in the presence of a finely divided, non-colloidal, metal of the platinum group.

2. The manufacture of hydroquinin by treating quinin with hydrogen in the presence of a metal of the platinum group in the finely divided state deposited on inert bodies.

In testimony whereof I have signed my name to this specification in the presence of two subscribing witnesses.

HEINRICH THRON.

Witnesses:
 JEAN GRUND,
 CARL GRUND.